March 17, 1959 L. B. PERKINS 2,878,473

TELEVISION ANTENNA

Filed Oct. 2, 1956 2 Sheets-Sheet 1

Loya B. Perkins
INVENTOR.

BY Clarence A. O'Brien
and Harvey B. Jacobson
Attorneys

March 17, 1959 L. B. PERKINS 2,878,473

TELEVISION ANTENNA

Filed Oct. 2, 1956 2 Sheets-Sheet 2

Loya B. Perkins
INVENTOR.

BY Clarence A. O'Brien and Harvey B. Jacobson
Attorneys 2,878,473
United States Patent Office
Patented Mar. 17, 1959

2,878,473

TELEVISION ANTENNA

Loya B. Perkins, Lufkin, Tex.

Application October 2, 1956, Serial No. 613,415

1 Claim. (Cl. 343—866)

This invention relates to a television antenna adapted for use in receiving signals on all television channels now in use.

The primary object of the present invention resides in the provision of a television antenna adapted for use in receiving signals broadcast on all of the channels now in use yet which is of a novel and highly attractive appearance.

A further object of the invention resides in the provision of an antenna of a size and appearance such that it will not detract from the appearance of a home when installed thereon and which may employ a suitable number of antenna rods corresponding to the various television channels arranged in a fan-like array with each antenna rod being adapted for reception of signals broadcast in a particular channel of the low band while the high band signals will be received by the composite array.

Still further objects and features of this invention reside in the provision of a television antenna which simulates in appearance a bow and arrow so as to be highly attractive and novel in appearance, which is strong and durable, simple in construction and installation, and unexpectedly effective for signal reception.

These, together with the various ancillary objects and features of the invention which will become apparent as the following description proceeds, are attained by this television antenna, a preferred embodiment of which has been illustrated in the accompanying drawings, by way of example only, wherein.

Figures 1, 4:
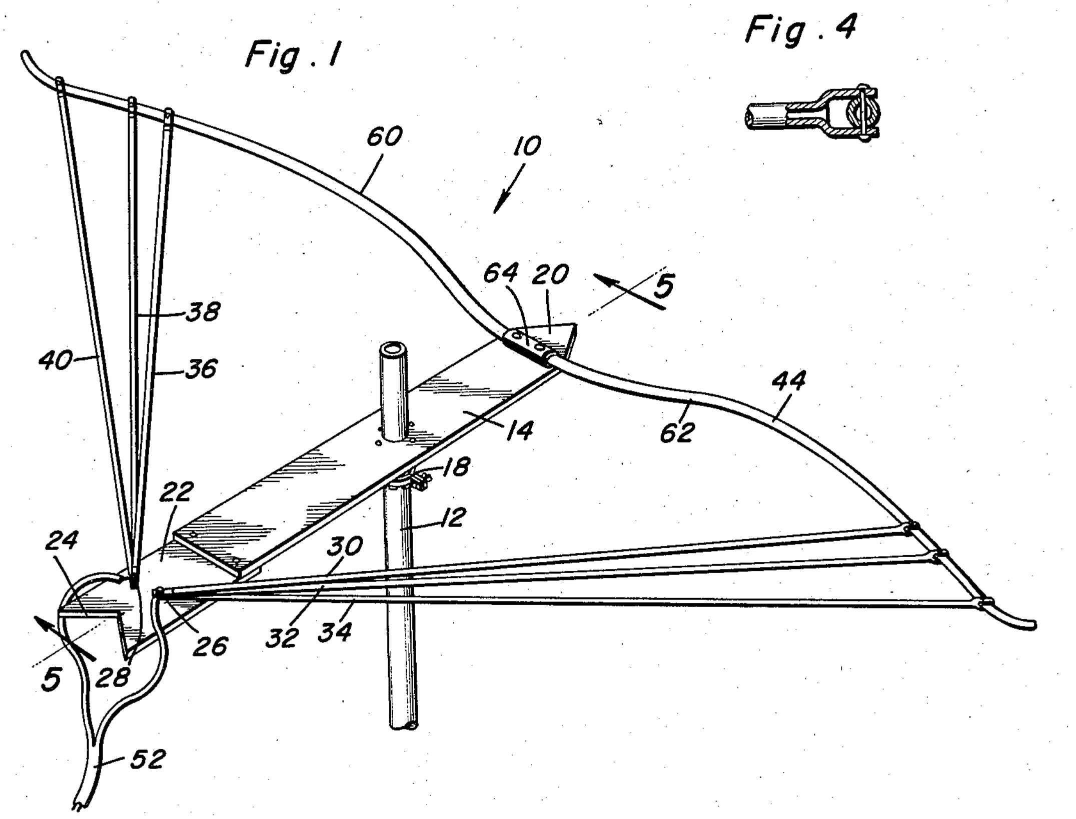
Figure 1 is a perspective view of the television antenna comprising the present invention.
Figure 4 is an enlarged sectional detail view as taken along the plane of line 4—4 in Figure 2 illustrating in particular the connection between the support member and an antenna rod.
Figure 2:
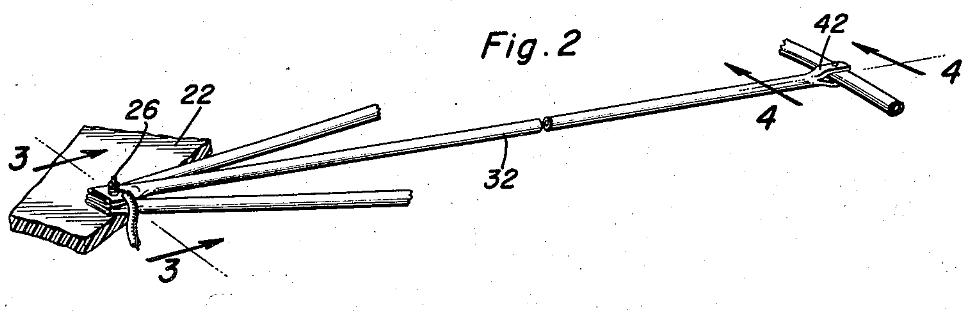
Figure 2 is an enlarged partial perspective view of the invention illustrating the manner of construction and attachment of the antenna rod.

With continuing reference to the accompanying drawings wherein like reference numerals designate similar parts throughout the various views, reference numeral 10 is used to generally designate the composite array comprising the present invention. This television antenna is adapted to be mounted on a mast 12 of any suitable size and shape by means of four generally rectangular angle shaped members as are indicated at 16 which are riveted or otherwise secured to the undersurface of the strap 14 and which are held clampingly in engagement with the mast 12 by means of a clamp 18.

The strap 14 is pointed at its end as at 20 and has affixed to the other end an insulative plate 22 having a triangular shaped recess as at 24 therein. Thus, the strap 14 together with the plate 22 simulates an arrow in shape. The plate 22 may be riveted or otherwise affixed to the strap 14 and carries a pair of terminals 26 and 28. A plurality of antenna rods as is indicated at 30, 32, 34, and 36, 38 and 40 are secured to the terminals 26 and 28 respectively and thus to the strap.

The terminals 26 and 28 extend through the flattened end portions of the antenna rods which are arranged in a graduation fan-like arrangement so that the various antenna rods are especially adapted for reception of signals broadcast on the low band channel frequencies. The other ends of the rods are bifurcated as at 42 for attachment to the sections of a bow-shaped support member 44, it being noted that rivets or other fasteners may be used to secure the bifurcated ends 42 of the antenna rods to the support member 44.

Figure 3:
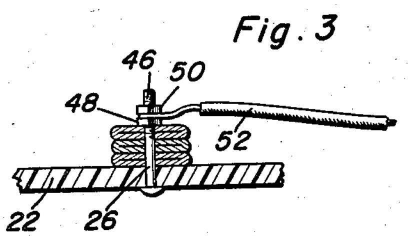
Figure 3 is an enlarged sectional detail view as taken along the plane of line 3—3 in Figure 2 illustrating the terminal connection for the antenna rod.
Figures 5, 6:
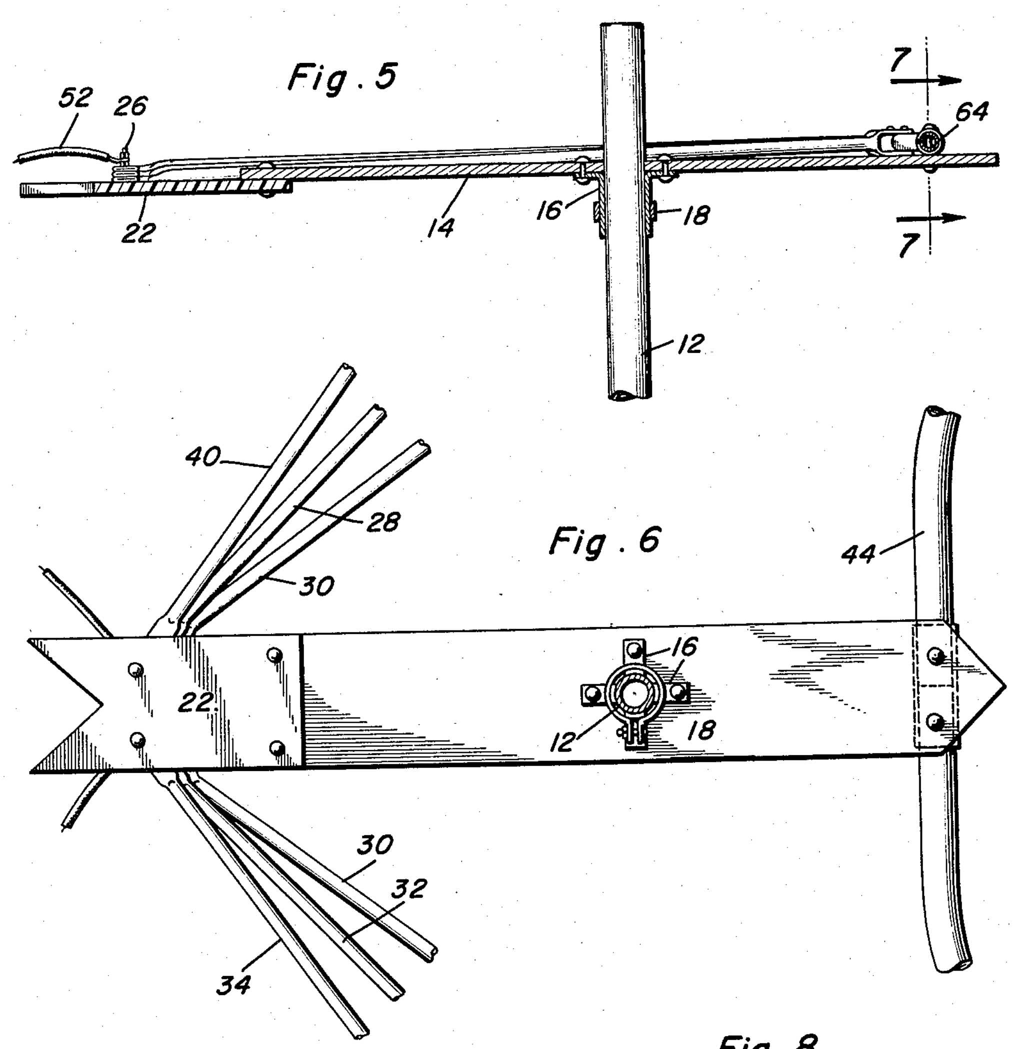
Figure 5 is a horizontal sectional view as taken along the plane of lines 5—5 in Figure 1 illustrating in enlarged scale the construction of the strap and associated insulative plate and means for attaching the invention to a mast.
Figure 6 is an enlarged horizontal sectional view illustrating the strap in plan view looking from the underside thereof.
Figure 8:
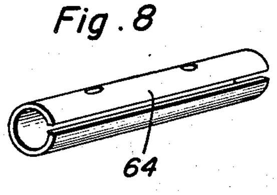
Figure 8 is a perspective view of the split tube used in connecting the sections of the support member together.

As can be seen best in Figure 3, each of the terminals 26 comprises a bolt which has its threaded upper end portion 46 provided with a first nut 48 molding the various antenna rods in position and with another nut 50 holding an antenna lead-in wire 52 to the terminal 26. Of course, the antenna lead-in wire 52 may be the conventional twin-lead antenna lead-in wire or may be coaxial type of lead-in wires where the antenna is mounted very remote from the receiver.

Figure 7:
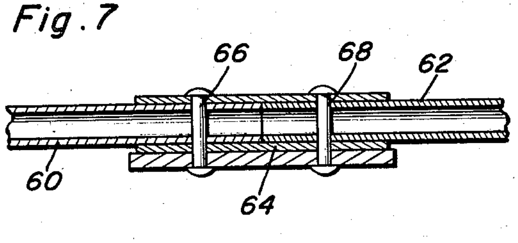
Figure 7 is a sectional detail view as taken along the plane of line 7—7 in Figure 5 illustrating the sectional construction of the bolt-shaped support member.

The support member 44 is shaped in the form of a bow and is formed in sections 60 and 62. As can be seen best in Figure 7, each of the sections 60 and 62 are of tubular construction and are adapted to be received in a split tube 64 disposed on the strap 14 adjacent the end 20. The sections 60 and 62 are adapted to be resiliently received within the split tube 64 and rivets as at 66 and 68 are used to hold the straps 60 and 62 within the split tube 64 and to hold the tube 64 and hence the sections 60 and 62 to the strap 14.

As can be readily seen from an inspection of Figure 1, the composite assembly simulates a bow and arrow with the arrow notched in the strings simulated by the antenna rods. This novel and highly effective appearance for an antenna results in the provision of an array which is not detrimental to the appearance of a home yet which is surprisingly effective in receiving signals on all channels.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An antenna for television reception comprising a mounting strap secured to a mast, a bow shaped support member secured to said strap adjacent a first end thereof, said first end of said strap including a projecting triangulated portion, an insulative plate secured to the other end of said strap, said insulative plate including a recessed triangulated portion, a pair of terminals secured to said plate, and a plurality of antenna rods secured to said terminals, said antenna rods being disposed in a fan formation and being secured to said support member, said support member being formed in sections, a tube positioned on said strap, said sections being received in said tube, and fasteners securing said sections in said tube and said tube to said strap, said plate and said strap combined being of arrow shape.

References Cited in the file of this patent

FOREIGN PATENTS 741,779 Great Britain ---------- Dec. 14, 1955